(12) United States Patent
Borkenhagen (10) Patent No.: US 10,031,820 B2
(45) Date of Patent: Jul. 24, 2018

(54) MIRRORING HIGH PERFORMANCE AND HIGH AVAILABLITY APPLICATIONS ACROSS SERVER COMPUTERS

(71) Applicant: Lenovo Enterprise Solutions (Singapore) Pte. Ltd., Singapore (SG)

(72) Inventor: John M. Borkenhagen, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1360 days.

(21) Appl. No.: 13/743,881

(22) Filed: Jan. 17, 2013

(65) Prior Publication Data

US 2014/0201314 A1    Jul. 17, 2014

(51) Int. Cl.
G06F 13/00      (2006.01)
G06F 11/20      (2006.01)
G06F 11/16      (2006.01)

(52) U.S. Cl.
CPC ...... *G06F 11/2023* (2013.01); *G06F 11/1666* (2013.01); *G06F 11/2035* (2013.01); *G06F 11/2038* (2013.01); *G06F 11/2043* (2013.01)

(58) Field of Classification Search
CPC .. G06F 3/0689; G06F 3/0626; G06F 11/1456; G06F 2211/1004; G06F 11/1469; G06F 3/067; G06F 11/165; G06F 11/20; G06F 11/1641; G06F 11/2038; H04L 29/06; H04L 29/08072; H04L 29/08549; H04L 29/08801; H05K 999/99
USPC ........ 709/212–214, 216–217; 711/105, 102, 711/119, 162, 213; 714/11
See application file for complete search history.

(56) References Cited

U.S. PATENT DOCUMENTS

| | | | |
|---|---|---|---|
| 5,983,360 A * | 11/1999 | Ugajin | G06F 11/2038 714/11 |
| 6,965,979 B2 * | 11/2005 | Burton | 711/202 |
| 7,028,218 B2 | 4/2006 | Schwarm et al. | |
| 7,099,794 B2 | 8/2006 | LeClerg et al. | |
| 7,287,138 B2 * | 10/2007 | Bland et al. | 711/162 |
| 7,783,918 B2 | 8/2010 | Lu | |
| 8,225,181 B2 * | 7/2012 | Perlmutter et al. | 714/773 |
| 8,898,408 B2 * | 11/2014 | Berke et al. | 711/162 |
| 2002/0133740 A1 * | 9/2002 | Oldfield et al. | 714/6 |
| 2002/0133743 A1 * | 9/2002 | Oldfield et al. | 714/11 |
| 2002/0133744 A1 * | 9/2002 | Oldfield et al. | 714/11 |
| 2007/0168452 A1 * | 7/2007 | Winter | 709/213 |
| 2008/0162807 A1 | 7/2008 | Rothman et al. | |
| 2009/0292861 A1 * | 11/2009 | Kanevsky et al. | 711/103 |
| 2010/0017496 A1 * | 1/2010 | Kimmel et al. | 709/212 |
| 2010/0083247 A1 * | 4/2010 | Kanevsky et al. | 718/1 |
| 2010/0332756 A1 | 12/2010 | Yarch et al. | |
| 2011/0004709 A1 * | 1/2011 | Gower et al. | 710/51 |

(Continued)

*Primary Examiner* — Robert B Harrell
(74) *Attorney, Agent, or Firm* — Jeffrey L. Stevens (57) ABSTRACT

Systems and methods to mirror data and otherwise manage memory are provided. A buffer may be coupled to a processor and be configured to write a first copy of data to a first memory located at a first server computer and a second copy of the data to a second memory that is accessible to both the first server computer and a second server computer. The buffer may be coupled directly to at least one of the first memory and the second memory via a memory bus, copper cable, or an optical cable. The buffer may write the first and the second copies of the data concurrently.

17 Claims, 6 Drawing Sheets

(56) References Cited

U.S. PATENT DOCUMENTS

| | | |
|---|---|---|
| 2011/0173385 A1 | 7/2011 | Swanson et al. |
| 2011/0270945 A1* | 11/2011 | Shiga et al. ................. 709/213 |
| 2011/0271059 A1* | 11/2011 | Aho et al. .................... 711/147 |
| 2012/0079316 A1 | 3/2012 | Bulusu et al. |
| 2012/0124415 A1 | 5/2012 | Borkenhagen et al. |
| 2013/0054807 A1* | 2/2013 | Sherwood et al. ........... 709/226 |

* cited by examiner

MIRRORING HIGH PERFORMANCE AND HIGH AVAILABLITY APPLICATIONS ACROSS SERVER COMPUTERS

I. FIELD OF THE DISCLOSURE

The present disclosure relates generally to computer networks, and more specifically, to computer memory mirroring operations.

II. BACKGROUND

Memory mirroring provides redundant storage to minimize the loss of time and data associated with server failures and recovery. Mission critical applications, such as database, analytics, and messaging applications, must be recovered in a timely fashion in the event of a server failure. Conventional data backup systems may require unacceptable downtime and administrator intervention. For instance, a primary server can wait idly for acknowledgement that data has been successfully mirrored to a backup server. The storage path, itself, may introduce further delays. For example, data mirrored using a Peripheral Component Interconnect Express (PCIe) fabric typically involves traversing an input/output (I/O) interface and numerous switches, in addition to the execution of kernel code. Still other systems, such as those using a flash-backed dual in-line memory module (DIMM), may require the memory to be physically moved to another server before an application can resume.

III. SUMMARY OF THE DISCLOSURE

According to a particular embodiment, an apparatus for managing memory may include a processor and a buffer configured to write a first copy of data to a first memory located at a first server computer and a second copy of the data to a second memory that is accessible to both the first server computer and a second server computer. The buffer may be coupled directly to both the first memory and the second memory. The buffer may be coupled to a buffer of the second memory. The buffer may write the first and the second copies of the data concurrently. The buffer may write the first and the second copies of the data at a dynamic random access module speed. The first memory may include at least one of any type of any volatile or nonvolatile memory. Examples include a dynamic random-access memory (DRAM) dual in-line memory module (DIMM), a flash-backed DIMM (NVDIMM), a solid state drive (SSD) flash DIMM, NAND Flash, magnetoresistive random-access memory (MRAM), phase change memory (PCM), Resistive random-access memory (ReRAM), among others.

A copper cable may connect the buffer to at least one of the first memory, the second memory, and a buffer of the second server computer. In another embodiment, an optical cable may connect the buffer to at least one of the first memory, the second memory, and a buffer of the second server computer. The processor and the buffer may be collocated at the first server computer. The processor may be configured to initiate reading stored data from the first memory and not from the second memory. The first server computer and the second server computer may be configured to automatically resume operations of the other in response to a processing interruption. No processor cycles of the processor may be used to copy the data from the buffer to the first memory and the second memory. The second memory may include a multiplexer. The second memory may include a shared memory that is remote from the first and second server computers.

According to another embodiment, an apparatus includes a processor configured to initiate writing of data and a buffer coupled to the processor. The buffer may be configured to receive the data and to write a first copy of the data to a first memory located at a first server computer and a second copy of the data to a second memory accessible to the first sever computer and a second server computer.

According to another embodiment, a method of managing memory includes generating data at a processor to write to a first memory of a first server computer. A first copy of the data may be written to the first memory and a second copy of the data may be written to a second memory that is accessible to both the first server computer and a second server computer. The method may further include coupling the buffer to the second memory using at least one of a copper cable and an optical cable. Another embodiment of the method may include coupling the buffer to a second buffer of the second server using at least one of a copper cable and an optical cable. The second memory may include a shared memory that is remote from the first and second server computers. An application may be automatically resumed at the second server computer in response to a failure at the first server computer.

The data written by the processor via the buffer may be subject to little to no latency because no acknowledgement of receipt is necessary, and the transmittal path may not include I/O adapter interfaces and other processes typical to conventional paths. The processor is free to write the data and move on to other work. Additionally, the processor may not have to allocate processing cycles to write the data via the buffer, freeing up processor resources. As operations transition automatically from one server computer to another, an embodiment provides high availability of data with minimal latency.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. DETAILED DESCRIPTION

The buffer may be preconfigured with an extra port and logic to locally store data and to selectively mirror the data at a remote storage location. An embodiment of a system leverages cost and technology advancements associated with high speed copper and optical interconnects, along with a memory interface architecture of narrow high speed interfaces to provide a dynamic random-access memory (DRAM)/flash copy of critical data on a separate standby server. The critical data may alternatively or additionally be stored in a pool of memory accessible to multiple servers. The system may protect a log or critical data against a server fail and may allow an application to continue running on the back-up server with no physical reconfiguration. High availability protection may thus be provided at DRAM speeds.

According to a particular embodiment, applications may automatically identify their critical data to a server. The critical data may be associated with particular purpose, storage area, time stamp, or other consideration. For the identified critical data, applications use memory regions that are mirrored (copy on write) to either memory/flash physically located on a backup server or a pool of memory through a switch to which a back-up server has access. This writing may be done at normal DRAM speeds. On a failure, the application takes over on the backup server immediately where it left off, using the copy of memory.

According to an embodiment, a memory copy may be in the same chassis for standard high availability, or optically connected remotely to protect against a data center disaster. Memory write latency to the copy may not impact performance. Read operations may be done only on the local memory and may be done at normal DRAM speed.

An embodiment may include logic in a memory path to enable server writes on a memory bus to two DIMMs/flash memories at once. Each DIMM may be readable by either or only one server. All memory of an embodiment may be remotely mirrored. In another embodiment, only critical regions, like a log, may be mirrored, e.g., without having to mirror the operating system, the hypervisor, the application code, or the non-critical data.

An electrical or an optical switch may be used to connect primary and backup servers. The primary and backup servers may be configured dynamically via software control. Disaster recovery support may be provided at a backup server located at different locations with optical memory connection. Write latency is not an issue, as the processor may send the data as if it is writing it to its own DIMM.

According to a particular embodiment, there may be no designated primary or backup server. Each server may effectively backup each other, and all servers may be active. A switch interconnect may optionally be copper or optical. Embodiments of memory may include DRAM, DIMMs, Flash-Backed DIMMs (NVRAM), or solid state drive (SSD) Flash DIMMs, among others.

In an embodiment of a fanout buffer, optical cable or copper cable may come directly from a buffer package. Alternatively, traces may be positioned on the motherboard towards the front of a server. For memory mirroring, an optic cable or a copper cable may plug into a DIMM package that includes a multiplexer on the DIMM. Alternatively, the DIMM may include a trace on the motherboard board that runs to the front of the server. For pure systems/blade form factor, copper or an optical connection in front may include a special connector to an adjacent blade (e.g., as with BladeCenter HX5), or may connect to a Top of Rack (TOR) switch via cables or a switch in back of chassis.

According to another embodiment, a processor may drive DIMMs directly without going through a buffer. The mirrored copy of the data may be received directly from the DIMM or the processor. DIMMs may include interface logic between the DIMM bus and the DRAM on the DIMM. That interface logic may create a duplicate bus to drive to the mirrored DIMM. The DIMM interface logic on the backup server may choose which DIMM bus to input.

An embodiment may mirror critical data to a backup server at DRAM speeds by simultaneously writing two or more DIMMs, including one on the backup server and another on the same memory bus at normal DRAM speeds. Memory may be mirrored to the backup server using CPU memory mirroring capabilities. The memory may be specifically mirrored to a DIMM on a memory bus physically located on second server. Memory may be alternatively or additionally mirrored to a memory pool that is accessible at DRAM speeds by multiple servers, including a backup server. Instead of mirroring in such a manner as to create two copies of data, one copy may be maintained in shared pool that is accessible by the backup server when the primary server fails. Where a primary server fails, the backup server may automatically and seamlessly take over the application and resume tasks at the point of the failure on the primary server. No physical interaction may be required. The system management software may be notified of the primary server failure and may enable the backup server to immediately take over using the memory copy or the memory pool without a loss of critical data or a costly interruption.

Figure 1:
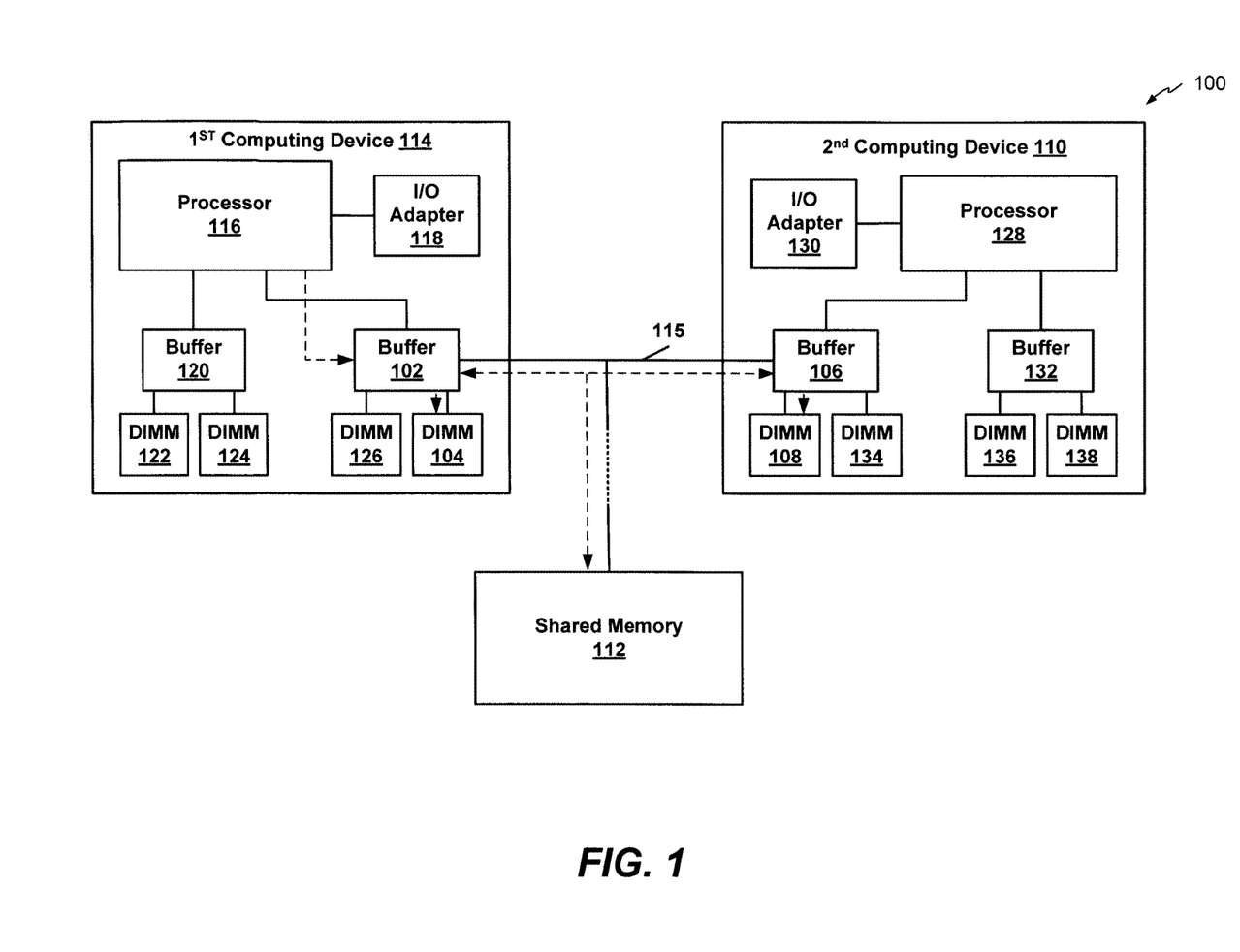
FIG. 1 is a block diagram of an embodiment of a computing system that includes a buffer configured to concurrently mirror an application and associated data to a local memory and to a buffer and an associated memory of another server computer, or alternatively, to a remote shared memory.

Turning more particularly to the drawings, FIG. 1 generally illustrates a block diagram of an embodiment of a computing system 100 that includes a buffer 102 configured to concurrently mirror an application and associated data. The application/data may be mirrored to a local DIMM 104 and to a buffer 106 and an associated DIMM 108 of a remote computing device 110, or alternatively, to a remote shared memory 112. The buffer 102 may be directly connected via a copper or optical cable 115 to the buffer 106 and/or the shared memory 112.

The second computing device 110, or second server computer, may be used to backup data from a first computing device 114, or first server computer. Where so configured, the first computing device 114 and the second computing device 110 may alternatively perform as both primary and backup servers to one another. For instance, the second computing device 110 may be configured to automatically and seamlessly resume computing operations in response to a failure or other interruption at the first computing device 114.

In addition to the buffer 102, the first computing device 114 may include a processor 116, an I/O adapter 118, a buffer 120, and DIMMs 104, 122, 124, 126. The processor 116 may be configured to initiate reading data from the local DIMMs 104, 122, 124, 126 of the first computing device 114 via local memory buses. The second computing device 110 may similarly include a processor 128, an I/O adapter 130, buffers 106, 132, and DIMMs 108, 134, 136, 138.

When the processor 116 of the first computing device 114 writes to a protected address, the data may be written to both the local DIMM 104 and the DIMM 108 of the second computing device 110. In a particular embodiment, the data may be written to both the local DIMM 104 and the shared memory 112, or memory pool. Conversely, when the processor 128 of the second computing device 110 writes to a protected address, the data may be concurrently written to both a local DIMM 136 and a DIMM 126 of the first computing device 114. For purposes of this description, concurrently may include simultaneous action as well as substantially simultaneous operations, and data may include applications used to generate the data to be mirrored. The processors 116 and 128 may include logic to initiate resuming operations when those of a designated, remote server computer are interrupted. In an embodiment, the processor 128 may not be provided with or otherwise access memory address ranges associated with the DIMM 108 or shared memory 112 storing the mirrored data until a failure occurs.

The shared memory 112 may be concurrently accessed by both computing devices 110, 114. For instance, the buffer 106 of the second computing device 110 may access data stored in the shared memory 112 in response to a failure at the first computing device 114. The buffer 102 of the first computing device 114 may recover data from the shared memory 112 in response to a failure at the second computing device 110. The cable 115 is shown in a dashed line to denote that the cable connection to the shared memory 112 may not be present in all embodiments. Conversely, an embodiment having a cabled connection to the shared memory 112 may not have a connection to the buffer 106. An embodiment of the copper or optical cable 115, which carries memory signaling, may use a straight redrive of an existing memory protocol that has been time multiplexed into a narrower interface with higher frequency transfer rate to reduce the number of lanes and physical size of the interconnect. Another illustrative protocol on the copper or optical cable 115 may be encapsulated into an industry standard protocol (e.g., PCI Express or Ethernet). The protocol on the copper or optical cable 115 may be encapsulated into a proprietary protocol.

The buffer 102 may include logic to direct data to be mirrored to both the buffer 106 and the DIMM 104 (and/or the shared memory 112). To this end, the buffer 102 may include a first port to the local DIMM 104 and a second port (in addition to the first port and a processor port) to communicate with the second computing device 110 or the shared memory 112. The buffer 102 may additionally be configured to retrieve data only locally, while still writing copies of the data to remote storage locations. The mirroring feature at the buffer 102 may be selectively deactivated or may ignore data that has been identified as non-critical.

The data written by the processor 116 via the buffer 102 may be subject to little or no latency because no acknowledgement of receipt is necessary, and the transmittal path may not include I/O adapter interfaces and other processes typical to conventional paths. The processor 116 is free to write the data and move on to other work. The data may be transmitted at DRAM speeds. Additionally, the processor 116 may not have to allocate processing cycles to write the data via the buffer 102, freeing up processor resources. As operations transition automatically from one server computer to another, an embodiment provides high availability of data with minimal latency.

Figure 2:
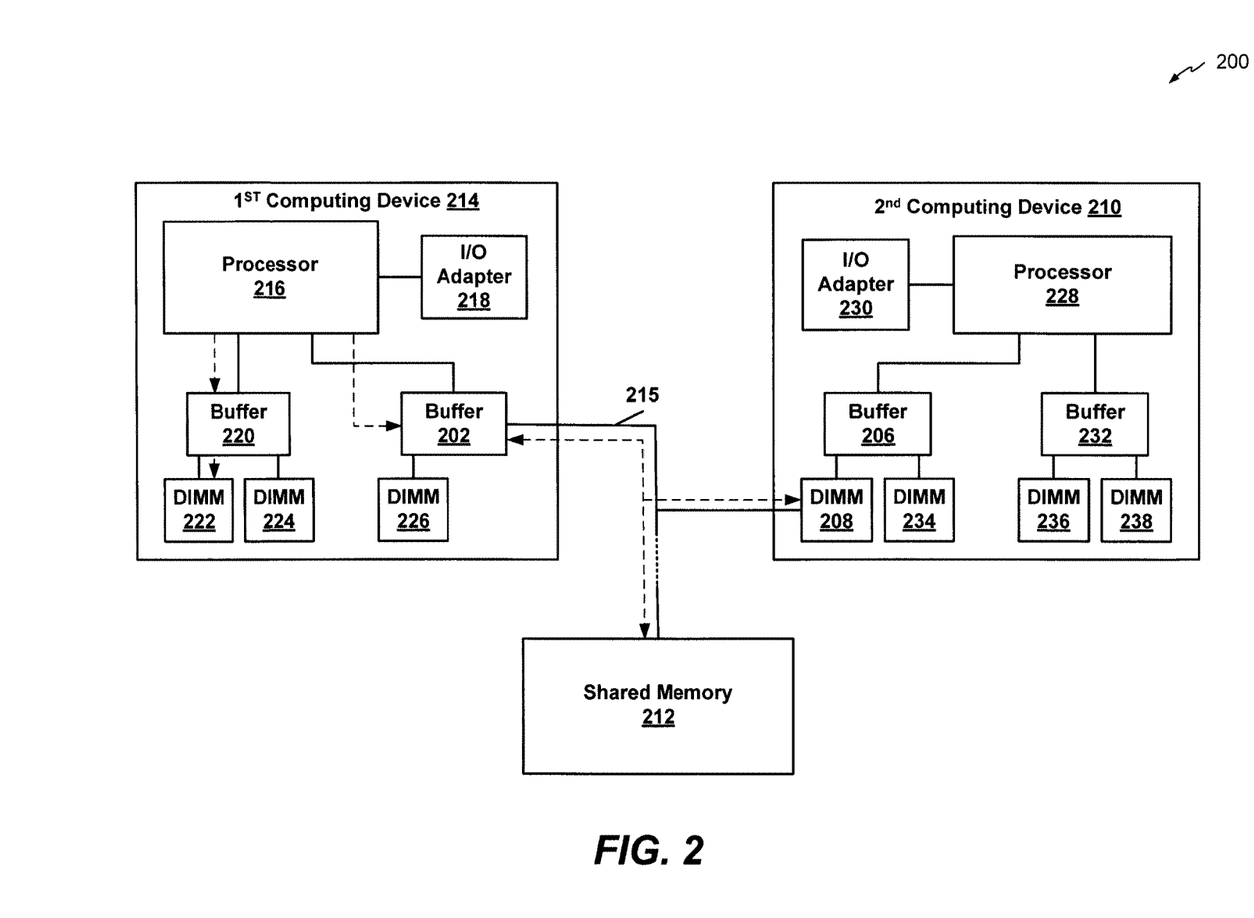
FIG. 2 is a block diagram of an embodiment of a computing system that includes a buffer configured to concurrently mirror an application and associated data to a local memory and to a memory of another server computer, or alternatively, to a remote shared memory.

FIG. 2 generally illustrates an embodiment of a system 200 that includes a buffer configured to concurrently mirror an application and associated data to a local memory and directly to a memory of another server computer, or alternatively, to a remote shared memory. With particular reference to FIG. 2, the application/data may be mirrored to a local DIMM 222 and to a DIMM 208 of a remote computing device 210, or alternatively, to a remote shared memory 212. The buffer 202 may be directly connected via a copper or optical cable 215 to the DIMM 208 and/or the shared memory 212. An embodiment of the copper or optical cable 215, which carries memory signaling, may use a straight redrive of an existing memory protocol that has been time multiplexed into a narrower interface with higher frequency transfer rate to reduce the number of lanes and physical size of the interconnect. Another illustrative protocol on the copper or optical cable 215 may be encapsulated into an industry standard protocol (e.g., PCI Express or Ethernet). The protocol on the copper or optical cable 215 may be encapsulated into a proprietary protocol.

The second computing device 210 may be used to backup data from a first computing device 214. Where so configured, the first computing device 214 and the second computing device 210 may alternatively perform as both primary and backup servers to one another. For instance, the second computing device 210 may be configured to automatically and seamlessly resume computing operations in response to a failure or other interruption at the first computing device 214.

In addition to the buffer 202, the first computing device 214 may include a processor 216, an I/O adapter 218, a buffer 220, and DIMMs 222, 224, 226. The processor 216 may be configured to initiate reading data from the local DIMMs 222, 224, 226 of the first computing device 214. The second computing device 210 may similarly include a processor 228, an I/O adapter 230, buffers 206, 232, and DIMMs 208, 234, 236, 238.

When the processor 216 of the first computing device 214 writes to a protected address, the data may be written to both the local DIMM 222 and the DIMM 208 of the second computing device 210. In a particular embodiment, the data may be written to both the local DIMM 222 and to the shared memory 212. Conversely, when the processor 228 of the second computing device 210 writes to a protected address, the data may be concurrently written to both the local DIMM 208 and the DIMM 222 of the first computing device 214. The processors 216 and 228 may include logic to initiate resuming operations when those of a designated, remote server computer are interrupted. In an embodiment, the processor 228 may not be provided with or otherwise access memory address ranges associated with the DIMM 208 or the shared memory 212 storing the mirrored data until a failure occurs. A link between the buffer 206 and the DIMM 208 may be enabled in response to such a failure.

The shared memory 212 may be concurrently accessed by both computing devices 210, 214. For instance, the processor 228 of the second computing device 210 may access data stored in the shared memory 212 in response to a failure at the first computing device 214. The buffer 202 of the first computing device 214 may recover data from the shared memory 212 in response to a failure at the second computing device 210.

The buffer 202 may include logic to direct data to be mirrored to both the DIMM 222 and the DIMM 208 (and/or the shared memory 212). To this end, the buffer 202 may include a first port to the local DIMM 222 and a second port to communicate with the second computing device 210 and the shared memory 212. The buffer 202 may additionally be configured to retrieve data only locally, while still writing copies of the data to remote storage locations. The mirroring feature at the buffer 202 may be selectively deactivated or may ignore data that has been identified as non-critical. The DIMM 208 may include an additional port (e.g., two inputs)

and a multiplexer for accessing stored data. For example, the DIMM 208 may include a connection to the first computing device 214.

Figure 3:
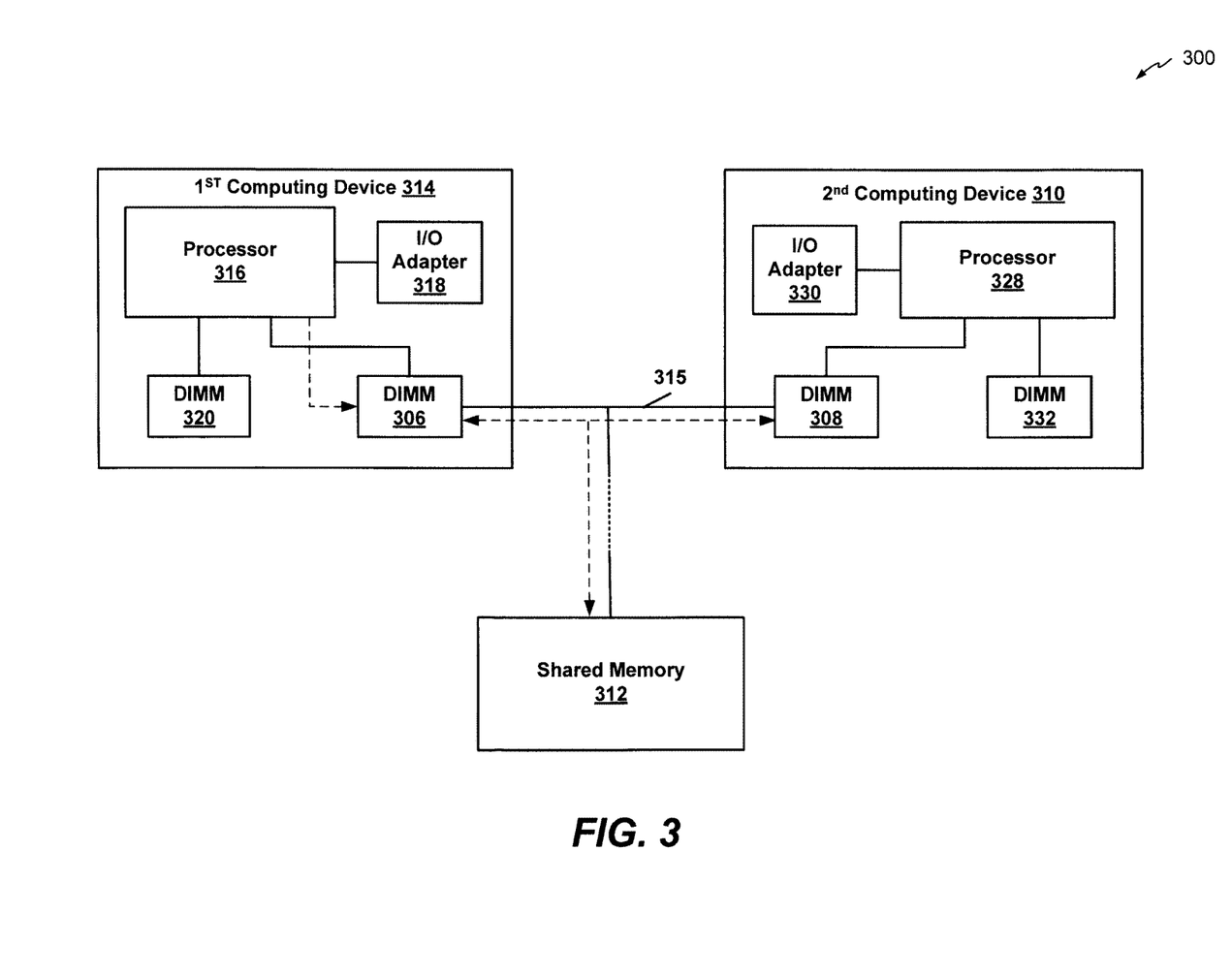
FIG. 3 is a block diagram of an embodiment of a computing system that includes a local memory configured to concurrently mirror an application and associated data to a memory of another server computer, or alternatively, to a remote shared memory.

FIG. 3 generally illustrates a block diagram of an embodiment of a processor that is configured to drive DIMMs directly without going through a buffer. The mirrored copy of the data may be received directly from the DIMM or the processor. DIMMs may include interface logic between the DIMM bus and the DRAM on the DIMM. The interface logic may create a duplicate bus to drive to the mirrored DIMM. The DIMM interface logic on the backup server may choose which DIMM bus to input. Turning more particularly to the drawings, a computing system 300 includes a DIMM 306 that is configured to mirror an application and associated data. The application/data may be mirrored to a local memory (e.g., DIMM 320 and to a DIMM 308 of a remote computing device 310, or alternatively, to a remote shared memory 312. The DIMM 306 may be directly connected via a copper or optical cable 315 to the DIMM 308 and/or the shared memory 312.

The second computing device 310, or second server computer, may be used to backup data from a first computing device 314, or first server computer. Where so configured, the first computing device 314 and the second computing device 310 may alternatively perform as both primary and backup servers to one another. For instance, the second computing device 310 may be configured to automatically and seamlessly resume computing operations in response to a failure or other interruption at the first computing device 314.

In addition to the DIMMs 306, 320, the first computing device 314 may include a processor 316 and an I/O adapter 318. The processor 316 may be configured to initiate reading data from the local DIMM 320 of the first computing device 314 via local memory buses. The second computing device 310 may similarly include a processor 328, an I/O adapter 330, and DIMMs 308, 332.

When the processor 316 of the first computing device 314 writes to a protected address, the data may be written to both the local DIMM 306 and the DIMM 308 of the second computing device 310. Conversely, when the processor 328 of the second computing device 310 writes to a protected address, the data may be concurrently written to both a local DIMM 306 and a DIMM 320 of the first computing device 314. The processors 316 and 328 may include logic to initiate resuming operations when those of a designated, remote server computer are interrupted. In an embodiment, the processor 328 may not be provided with or otherwise access memory address ranges associated with the DIMM 308 or shared memory 312 storing the mirrored data until a failure occurs.

The shared memory 312 may be concurrently accessed by both computing devices 310, 314. For instance, the DIMM 308 of the second computing device 310 may access data stored in the shared memory 312 in response to a failure at the first computing device 314. The DIMM 306 of the first computing device 314 may recover data from the shared memory 312 in response to a failure at the second computing device 310. The cable 315 is shown in a dashed line to denote that the cable connection to the shared memory 312 may not be present in all embodiments. Conversely, an embodiment having a cabled connection to the shared memory 312 may not have a connection to the DIMM 306. An embodiment of the copper or optical cable 315, which carries memory signaling, may use a straight redrive of an existing memory protocol that has been time multiplexed into a narrower interface with higher frequency transfer rate to reduce the number of lanes and physical size of the interconnect. Another illustrative protocol on the copper or optical cable 315 may be encapsulated into an industry standard protocol (e.g., PCI Express or Ethernet). The protocol on the copper or optical cable 315 may be encapsulated into a proprietary protocol.

The DIMMs 306, 308 may include logic to direct data to be mirrored. To this end, the DIMMs 306, 308 may include an additional port to communicate with the second computing device 310 or the shared memory 312. The DIMM 306 may additionally be configured to retrieve data only locally, while still writing copies of the data to remote storage locations. The mirroring feature at the DIMM 306 may be selectively deactivated or may ignore data that has been identified as non-critical.

The data written by the processor 316 via the DIMM 306 may be subject to little or no latency because no acknowledgement of receipt is necessary, and the transmittal path may not include I/O adapter interfaces and other processes typical to conventional paths. The processor 316 is free to write the data and move on to other work. The data may be transmitted at DRAM speeds. Additionally, the processor 316 may not have to allocate processing cycles to write the data via the DIMM 306, freeing up processor resources. As operations transition automatically from one server computer to another, an embodiment provides high availability of data with minimal latency.

Figure 4:
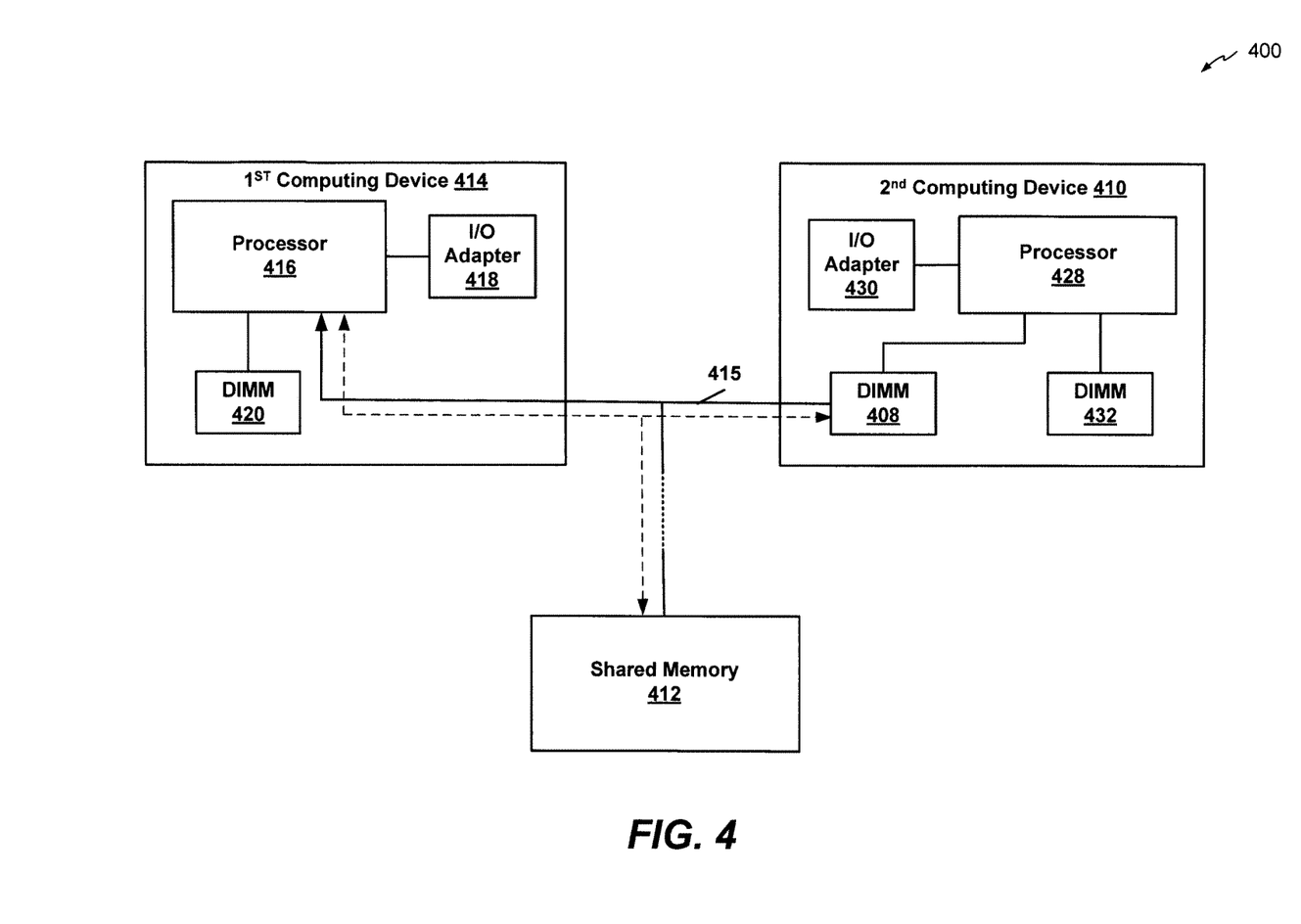
FIG. 4 is a block diagram of an embodiment of a computing system that includes a processor configured to concurrently mirror an application and associated data to a local memory and to a memory of another server computer, or alternatively, to a remote shared memory.

FIG. 4 generally illustrates an embodiment that includes processor that is running in memory mirrored mode and mirroring memory, itself. The mirrored copy of the memory may be physically located on the processor. The illustrated computing system 400 may include a processor 416 configured to concurrently mirror an application and associated data to a local memory (e.g., to itself or a DIMM 420) and directly to a memory (e.g., DIMM 408) of another server computer, or alternatively, to a remote shared memory 412. The processor 416 may be directly connected via a copper or optical cable 415 to the DIMM 408 and/or the shared memory 412. An embodiment of the copper or optical cable 415, which carries memory signaling, may use a straight redrive of an existing memory protocol that has been time multiplexed into a narrower interface with higher frequency transfer rate to reduce the number of lanes and physical size of the interconnect. Another illustrative protocol on the copper or optical cable 415 may be encapsulated into an industry standard protocol (e.g., PCI Express or Ethernet). The protocol on the copper or optical cable 415 may be encapsulated into a proprietary protocol.

The second computing device 410 may be used to backup data from a first computing device 414. Where so configured, the first computing device 414 and the second computing device 410 may alternatively perform as both primary and backup servers to one another. For instance, the second computing device 410 may be configured to automatically and seamlessly resume computing operations in response to a failure or other interruption at the first computing device 414.

In addition to the DIMM 420, the first computing device 414 may include an I/O adapter 418. The second computing device 410 may similarly include a processor 428, an I/O adapter 430, and DIMMs 408, 432.

Figure 5:
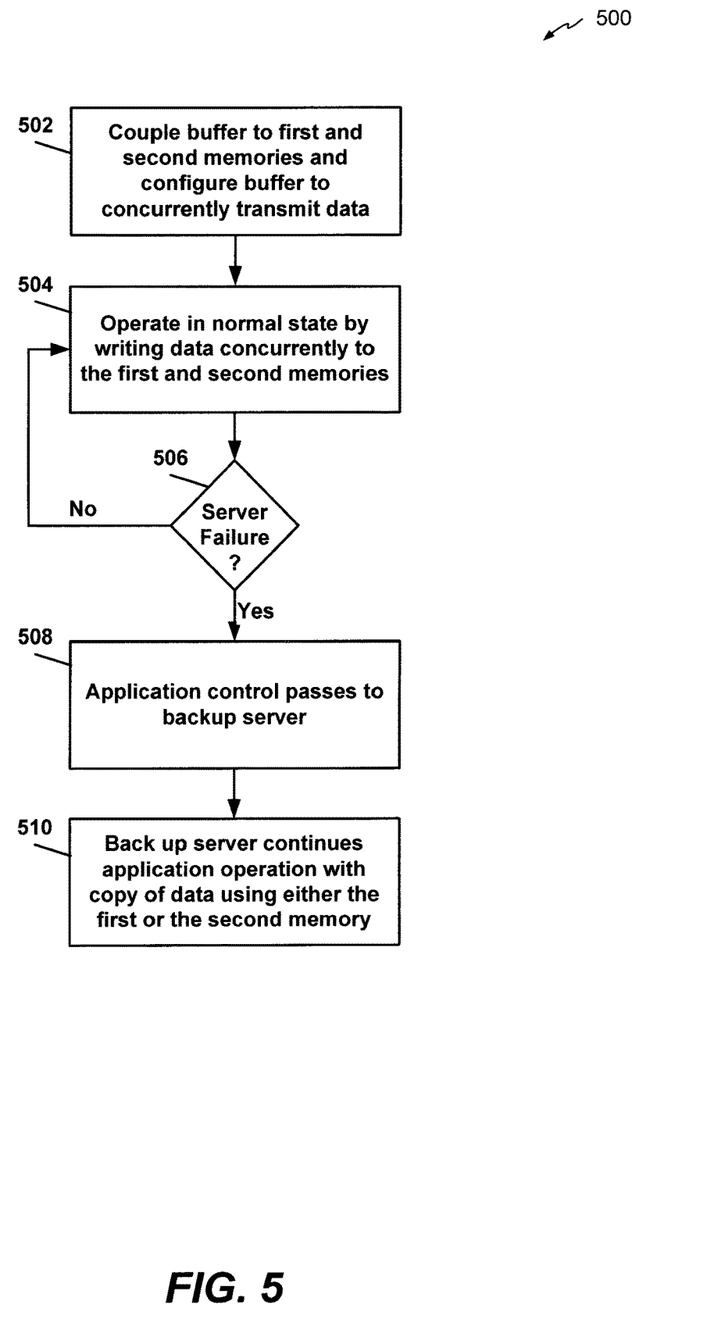
FIG. 5 is a flowchart of an embodiment of a method of managing memory that may be executed by one or more of the computing systems of FIGS. 1 and 2.

FIG. 5 is a flowchart of an embodiment of a method 500 of managing memory. The method may be executed by the systems 100, 200 of FIGS. 1 and 2. At 502, a buffer may be coupled to first and second memories to concurrently transmit data. For instance, the buffer 102 of FIG. 1 may be coupled via a first port to a memory bus and the local DIMM 104. A second port of the buffer 102 may be coupled via copper or optical cabling to the buffer 106 of the remote server computer 110 or to the shared memory 112.

The system may operate at 504 in a normal state by writing concurrently to the first and the second memories. For instance, the processor 116 of FIG. 1 may write data to a protected address range, resulting in the data being written to primary and backup server computers.

In response to a server failure at 506, the method 500 at 508 may pass application control over to the backup server computer. The backup server computer may continue to execute at 510 the application with an available copy of memory. The available copy may be retrieved from its local memory or from a remote shared memory pool. Optical cable laid over a significant distance may be used as a precaution against data center disaster. No physical action may be required for the transition of control. As such, critical applications and data may be continuously available.

Figure 6:
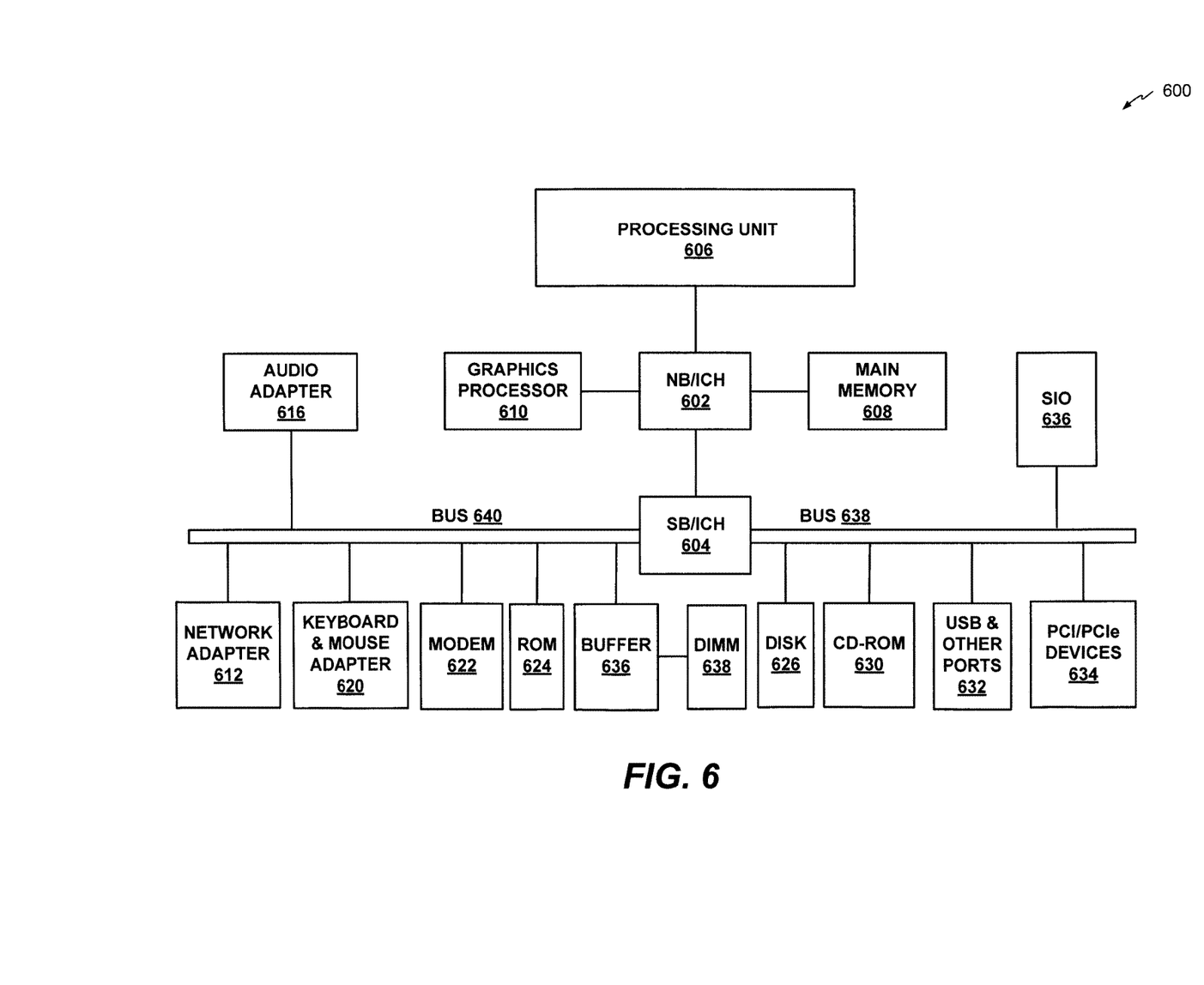
FIG. 6 is a block diagram of a general computing system that may be illustrative of a server computer of the systems of FIGS. 1 and 2.

FIG. 6 generally illustrates a block diagram of a computing apparatus 600 consistent with an embodiment. For example, the apparatus may be similar to a server computer of FIG. 1. The apparatus 600, in specific embodiments, may include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc.

The data processing system may include any device configured to process data and may encompass many different types of device/system architectures, device/system configurations, and combinations of device/system architectures and configurations. Typically, a data processing system will include at least one processor and at least one memory provided in hardware, such as on an integrated circuit chip. However, a data processing system may include many processors, memories, and other hardware and/or software elements provided in the same or different computing devices. Furthermore, a data processing system may include communication connections between computing devices, network infrastructure devices, and the like.

The data processing system 600 is an example of a single processor unit based system, with the single processor unit comprising one or more on-chip computational cores, or processors. In this example, the processing unit 606 may constitute a single chip with the other elements being provided by other integrated circuit devices that may be part of a motherboard, multi-layer ceramic package, or the like, to collectively provide a data processing system, computing device or the like.

In the depicted example, the data processing system 600 employs a hub architecture including a north bridge and a memory controller hub (NB/MCH) 602, in addition to a south bridge and an input/output (I/O) controller hub (SB/ICH) 604. A processing unit 606, a main memory 608, and a graphics processor 610 are connected to the NB/MCH 602. The graphics processor 610 may be connected to the NB/MCH 602 through an accelerated graphics port (AGP).

In the depicted example, a local area network (LAN) adapter 612 connects to the SB/ICH 604. An audio adapter 616, a keyboard and mouse adapter 620, a modem 622, a read only memory (ROM) 624, a hard disk drive (HDD) 626, a CD-ROM drive 630, a universal serial bus (USB) port and other communication ports 632, and PCI/PCIe devices 634 connect to the SB/ICH 604 through bus 638 and bus 640. The PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

As shown in FIG. 6, a buffer 636 is coupled to the memory bus 640. The buffer 636 may be similar to the buffer 102 of FIG. 1. As such, the buffer 636 may be configured to copy data to a remote memory, in addition to a local DIMM 638.

An HDD 626 and a CD-ROM drive 630 connect to the SB/ICH 604 through the bus 640. The HDD 626 and the CD-ROM drive 630 may use, for example, an integrated drive electronics (IDE) or serial advanced technology attachment (SATA) interface. A duper I/O (SIO) device 636 may be connected to SB/ICH 604.

An operating system runs on the processing unit 606. The operating system coordinates and provides control of various components within the data processing system 600 in FIG. 6. As a client, the operating system may be a commercially available operating system. An object-oriented programming system programming system may run in conjunction with the operating system and provide calls to the operating system from programs or applications executing on the data processing system 600. The data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as the HDD 626, and may be loaded into main memory 608 for execution by processing unit 606. The processes for illustrative embodiments may be performed by the processing unit 606 using computer usable program code. The program code may be located in a memory such as, for example, a main memory 608, a ROM 624, or in one or more peripheral devices 626 and 630, for example.

A bus system, such as the bus 638 or the bus 640 as shown in FIG. 6, may be comprised of one or more buses. The bus system may be implemented using any type of communication fabric or architecture that provides for a transfer of data between different components or devices attached to the fabric or architecture. A communication unit, such as the modem 622 or the network adapter 612 of FIG. 6, may include one or more devices used to transmit and receive data. A memory may be, for example, the main memory 608, the ROM 624, or a cache such as found in the NB/MCH 602 in FIG. 6.

Those of ordinary skill in the art will appreciate that the embodiments of FIG. 6 may vary depending on the implementation. Other internal hardware or peripheral devices, such as flash memory, equivalent non-volatile memory, or optical disk drives and the like, may be used in addition to or in place of the hardware depicted in FIG. 6. Further, embodiments of the present disclosure, such as the one or more embodiments may take the form of a computer program product accessible from a computer-usable or computer-readable medium providing program code for use by or in connection with a computer or any instruction execution system. For the purposes of this description, a non-transitory computer-usable or computer-readable medium can be any non-transitory medium that can tangibly embody a computer program and that can contain or store the computer program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD). The processes of the illustrative embodiments may be applied to a multiprocessor data processing system, such as a SMP, without departing from the spirit and scope of the embodiments.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, the data processing system 600 may be a portable computing device that is configured with flash memory to provide non-volatile memory for storing operating system files and/or user-generated data, for example. Essentially, the data processing system 600 may be any known or later developed data processing system without architectural limitation.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
a first server computer including a first processor configured to initiate writing of data, a buffer coupled to the first processor, and a first memory coupled to the buffer;
a second server computer; and
a cable coupled to the buffer for providing communication with a second memory that is accessible to both the first server computer and a second server computer, wherein the buffer is configured to receive data from first processor, write a first copy of the data to the first memory, and write a second copy of the data to the second memory.

2. The apparatus of claim 1, wherein the buffer is coupled directly to both the first memory and the second memory.

3. The apparatus of claim 1, wherein the buffer is coupled to a buffer of the second memory.

4. The apparatus of claim 1, wherein the buffer writes the first and the second copies of the data concurrently.

5. The apparatus of claim 1, wherein the buffer writes the first and the second copies of the data at a dynamic random-access memory (DRAM) speed.

6. The apparatus of claim 1, wherein the first memory includes at least one of a dual in-line memory module (DIMM), a dynamic random-access memory (DRAM), a flash-backed DIMM (NVRAM), a solid state drive (SSD) flash DIMM, a NAND, a magnetoresistive random-access memory (MRAM), and a phase change memory (PCM).

7. The apparatus of claim 1, wherein the cable is a copper cable.

8. The apparatus of claim 1, further comprising wherein the cable is an optical cable.

9. The apparatus of claim 1, wherein the processor is configured to initiate reading stored data from the first memory and not from the second memory.

10. The apparatus of claim 1, wherein the first server computer and the second server computer are configured to automatically resume operations of the other in response to a processing interruption.

11. The apparatus of claim 1, wherein no processor cycles of the processor are used to copy the data from the buffer to the first memory and the second memory.

12. The apparatus of claim 1, wherein the second memory includes a multiplexer.

13. The apparatus of claim 1, wherein the second memory includes a shared memory that is remote from the first and second server computers.

14. A method of managing memory, the method comprising:

a processor of a first server computer running an application and generating data to write to a first memory of the first server computer;

the first server writing a first copy of the data to the first memory;

the first server writing a second copy of the data to a second memory that is accessible to both the first server computer and a second server computer;

detecting that the first server computer has failed while running the application; and the second server computer automatically resuming the application using the second copy of the data on the second memory in response to detecting that the first server computer has failed.

15. The method of claim 14, further comprising:

coupling the processor directly to the second memory of the second server using at least one of a copper cable and an optical cable.

16. The method of claim 14, further comprising:

coupling the first memory directly to the second memory using at least one of a copper cable and an optical cable.

17. The method of claim 14, wherein the second memory includes a memory pool that is remote from the first and second server computers.

* * * * *